UNITED STATES PATENT OFFICE.

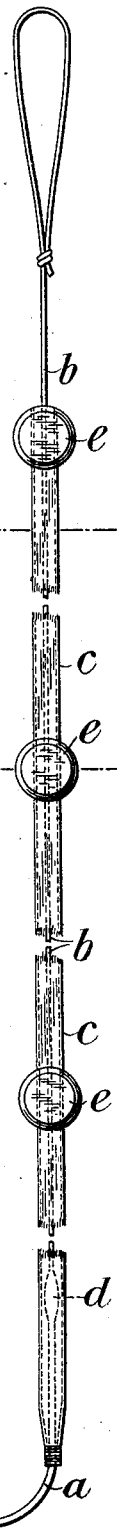
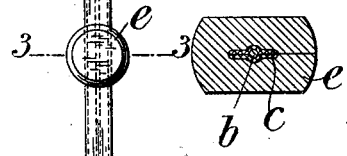

THOMAS FENNELLY, OF NOTTINGHAM, ENGLAND, ASSIGNOR OF ONE-HALF TO WILLIAM ROBERT HAMILTON, OF SAME PLACE.

FISHING-TACKLE.

SPECIFICATION forming part of Letters Patent No. 668,832, dated February 26, 1901.

Application filed November 1, 1900. Serial No. 35,134. (No model.)

*To all whom it may concern:*

Be it known that I, THOMAS FENNELLY, a subject of the Queen of Great Britain, residing at 130 Queen's Walk, Nottingham, England, have invented new and useful Improvements in Fishing-Tackle, of which the following is a specification.

This invention relates to improvements in fishing-tackle.

It is well known to anglers that the gut or the like to which the hook is attached is visible to fish notwithstanding that such gut has been reduced in thickness to such an extent that its strength frequently suffers in consequence.

The object of this invention is to provide means for concealing the gut; and to this end it consists mainly in the use in combination with the gut of an envelop so prepared as to present the appearance of a piece of weed.

In carrying out the invention the envelop is made, preferably, of silk in the form of a long narrow tube, through which the gut is passed and which may be of any desired length and extend down over the shank of the hook to cover the point of attachment between the gut and the hook, the said tube being of a color or combination of colors to correspond with the weed to be imitated or to suit the fancy of anglers.

To enable the invention to be fully understood, I will describe the same by reference to the accompanying drawings, in which—

Figure 1 is a view, drawn to an exaggerated scale, of the improved fishing-tackle. Figs. 2 and 3 are sections, respectively, on the lines 2 2 and 3 3 of Fig. 1, but drawn to a larger scale than the said figure.

$a$ is the hook, and $b$ the gut carrying the same in the usual manner. $c$ is the envelop, which I employ to conceal the said gut $b$ and the point of its junction with the hook $a$. This strip or envelop is preferably of tubular form, as shown clearly in Fig. 2, and can be woven in that form, or it can be formed of a strip folded so that its edges can meet and be connected together either throughout the whole length of the strip or at intervals. The envelop $c$ is connected at its lower end to the shank of the hook $a$, as shown at $d$. $e$ $e$ are split shot or the like for weighting the tackle and also serving when clipped upon the envelop to hold the latter in proper position upon the gut. In order to render the weights $e$ $e$ as nearly invisible as possible, they can be of the same color as the strip $c$.

The improved envelop, in addition to concealing the gut and its junction with the hook, possesses the further advantages that it allows of using a hook having a longer shank than is usual for light fishing, the advantages of such a hook being that it can be easily removed from the fish when swallowed without the use of a disgorger, which is at present necessary when the hook is swallowed; that the gut cannot be bitten through, as is frequently the case with a hook having a short shank, and that a larger percentage of "strikes" will be successful in forcing the barb into the fish on account of the greater leverage the long shank will give. Furthermore, it has the advantage of permitting of using gut of greater strength than can ordinarily be used or, if desired, of using wire or line instead of gut, whereby much greater strength and durability can be obtained. In addition the angler by providing himself with a number of sets of tackle having envelops of different colors can change about from one to another if he finds the fish getting accustomed to the one he is using.

It is to be understood that although I prefer to use my envelop in connection with a piece of gut, wire, or cord to which the hook is attached such piece of material may be dispensed with, the hook being lashed or bound directly to the end of the envelop.

For some kinds of fishing the envelop may be adapted to contain cork, which will cause it to more or less float; also, weights and buoyant material may be used in combination, so that when in the water the envelop will assume a wavy or sinuous form or float upward from the bottom.

Although in the drawings the envelop is represented as being used in connection with a single hook, it is to be understood that two or more hooks may be used in conjunction with a single envelop, such hooks being lashed to the gut, wire, or cord within the envelop and projecting through suitable apertures in the same.

Having now particularly described and ascertained the nature of my said invention and in what manner the same is to be performed, I declare that what I claim is—

1. As a new article of manufacture, a tubular envelop of woven fabric, formed to imitate a water-weed for concealing the connection between a fishing line and hook, substantially as described.

2. The combination with a fish-hook, of an envelop of woven fabric connected thereto and colored and formed to represent a water-weed to conceal the connection between the hook and its line, substantially as described.

3. The combination with a fish-hook, of a flexible connection secured thereto, and a tubular envelop of woven fabric and of much greater diameter than said flexible connection loosely surrounding said flexible connection for the purpose of concealing it, substantially as described.

4. The combination with a fish-hook, of a flexible connection secured thereto, a flat tubular envelop of woven fabric, and of much greater diameter than said connection surrounding the same and connected to the hook and weights clamped upon said envelop and its inclosed connection, substantially as described.

THOMAS FENNELLY.

Witnesses:
ARTHUR CHERREY,
WM. WHITTLEY.